United States Patent
Muecke et al.

(10) Patent No.: US 9,048,498 B2
(45) Date of Patent: Jun. 2, 2015

(54) ANODE FOR A HIGH-TEMPERATURE FUEL CELL AND PRODUCTION THEREOF

(75) Inventors: Robert Muecke, Juelich (DE); Norbert H. Menzler, Juelich (DE); Hans Peter Buchkremer, Heinsberg (DE); Matthias Ruettinger, Reutte (AT); Marco Brandner, Oy-Mittelberg (DE); Thomas Franco, Huettlingen (DE); Andreas Venskutonis, Reutte (AT)

(73) Assignee: Forschungszentrum Juelich GmbH, Juelich (DE)

( * ) Notice: Subject to any disclaimer, the term of this patent is extended or adjusted under 35 U.S.C. 154(b) by 212 days.

(21) Appl. No.: 13/510,057

(22) PCT Filed: Nov. 4, 2010

(86) PCT No.: PCT/DE2010/001295
§ 371 (c)(1),
(2), (4) Date: Jun. 14, 2012

(87) PCT Pub. No.: WO2011/060756
PCT Pub. Date: May 26, 2011

(65) Prior Publication Data
US 2012/0244456 A1    Sep. 27, 2012

(30) Foreign Application Priority Data
Nov. 18, 2009    (EP) .................................. 09400053

(51) Int. Cl.
*H01M 4/90* (2006.01)
*H01M 4/04* (2006.01)
(Continued)

(52) U.S. Cl.
CPC .......... *H01M 4/8636* (2013.01); *H01M 4/8652* (2013.01); *H01M 4/8825* (2013.01);
(Continued)

(58) Field of Classification Search
CPC ............ H01M 4/86; H01M 4/88; H01M 4/90
USPC .................................................. 429/400–535
See application file for complete search history.

(56) References Cited

U.S. PATENT DOCUMENTS

| | | |
|---|---|---|
| 6,428,920 B1 | 8/2002 | Badding et al. |
| 2003/0165726 A1 | 9/2003 | Robert et al. |

(Continued)

FOREIGN PATENT DOCUMENTS

| | | |
|---|---|---|
| CN | 1697229 | 11/2005 |
| EP | 1 598 892 | 11/2005 |

(Continued)

OTHER PUBLICATIONS

Brandner, Marco, Martin Bram, Jan Froitzheim, H.p. Buchkremer, and D. Stover. "Electrically Conductive Diffusion Barrier Layers for Metal-Supported SOFC." Solid State Ionics 179.27-32 (2008): 1501-504.*

(Continued)

*Primary Examiner* — Kenneth Douyette
*Assistant Examiner* — James Lee
(74) *Attorney, Agent, or Firm* — Jordan and Hamburg LLP

(57) ABSTRACT

The substrate-supported anode for a high-temperature fuel cell comprises an at least three-layer anode laminate on a metallic substrate. Each of the layers of the anode laminate comprises yttria-stabilized zirconia and nickel, wherein the mean particle size of the nickel decreases from one layer to the next as the distance from the substrate increases. The last layer of the anode laminate, which is provided for contact with the electrolyte, has a root mean square roughness of less than 4 μm. The overall mean pore size of this layer is typically between 0.3 and 1.5 μm. Starting powders having a bimodal particle size distribution of yttria-stabilized zirconia and nickel-containing powder are used at least for the first and second layers of the anode laminate. The mean particle size of the nickel-containing powder is reduced from one layer to the next, whereby it is advantageously no more than 0.5 μm in the last layer of the anode laminate.

22 Claims, 4 Drawing Sheets

(51) Int. Cl.
 H01M 4/86 (2006.01)
 H01M 4/88 (2006.01)
 H01M 8/12 (2006.01)

(52) U.S. Cl.
 CPC .......... *H01M4/8885* (2013.01); *H01M 4/9016* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 2003/0224232 | A1 | 12/2003 | Browall et al. |
| 2004/0043278 | A1* | 3/2004 | Bourgeois et al. ............... 429/35 |
| 2004/0058228 | A1* | 3/2004 | Shibata et al. ................... 429/44 |
| 2005/0089739 | A1 | 4/2005 | Seccombe, Jr. et al. |
| 2005/0142431 | A1* | 6/2005 | Shimomura et al. ............ 429/44 |
| 2007/0178366 | A1* | 8/2007 | Mahoney et al. ................ 429/44 |

FOREIGN PATENT DOCUMENTS

| | | |
|---|---|---|
| EP | 1 768 208 | 3/2007 |
| WO | WO-2006/082057 | 8/2006 |
| WO | WO-2007/067242 | 6/2007 |
| WO | WO-2007/093759 | 8/2007 |

OTHER PUBLICATIONS

Müller et al. (A. C. Müller, B. Pei, A. Weber, E. Ivers-Tiffée, "Properties of Ni/YSZ-cermets depending on their microstructure", in K. Hilpert, F. W. Froben, and L. Singheiser (Eds.), High Temperature Materials Chemistry: Proceedings of the 10th International IUPAC Conference 2, Jülich: Forschungszentrum Jülich, pp. 731-734 (2000).*

P. Attryde, A. Baker, S. Baron, A. Blake, N. P. Brandon, D. Corcoran, D. Cumming, A. Duckett, K. El-Koury, D. Haigh, M. Harrington, C. Kidd, R. Leah, G. Lewis, C. Matthews, N. Maynard, T. McColm, A. Selcuk, M. Schmidt, R. Trezona, L. Verdugo, Stacks and System based around metal supported SOFCs operating at 500-600#C", Electrochemical Proceedings vol. 2005-07, vol. 1, pp. 113-122 [2005].

G. Schiller; "Metallgestützte SOFC-Zellen (Metal-supported SOFC cells)", trainig seminar on materials questions related to high-temperature fuel cells, Deutsche GesellschaftfürMaterialkunde (German Society for Materials Science) (publisher), Jülich, Apr. 26-28, 2006 (presentation and paper).

H.J. Cho and G.M. Choi: Fabrication and characterization of Ni-supported solid oxide fuel cell, Solid State Ionics 180 [11-13], 792-795 (2009).

T.S. Smith: "Morphological Characterization of Porous Coatings." In: "Quantitative Characterization and Performance of Porous Implants for Hard Tissue Applications", ASTM STP953, J.E. Lemmons, publisher, American Society for Testing and Materials, Philadelphia, 1987, pp. 92-102.

M.I. Mendelson: "Average Particle size in Polycrystalline Ceramics", J. Am. Ceram. Soc. 52 [8] (1969), 443-446.

"Solid Oxide Fuel Cells 13 (SOFC-XIII)", Vo. 57, No. 1, pp. 1-48 T. Kawada and S.C. Singhal Copyright 2013 by The Electrochemical Society.

* cited by examiner

ANODE FOR A HIGH-TEMPERATURE FUEL CELL AND PRODUCTION THEREOF

BACKGROUND OF THE INVENTION

The invention relates to an anode for a high-temperature fuel cell, in particular for a solid oxide fuel cell, and to the production thereof. The anode is one which is used in a metal substrate-supported high-temperature fuel cell.

Solid oxide fuel cells (SOFC) are high-temperature fuel cells, which are presently operated at operating temperatures of 650 to 1000° C. The gas-tight electrolyte of this cell type comprises a solid ceramic material made of metal oxide, which is able to conduct ions, yet has an insulating effect with respect to electrons. The cathode is generally likewise produced from a ceramic material, which conducts ions and electrons. The anode is produced from a mixture which comprises nickel and yttria-stabilized zirconia, also known as cermet, which likewise conducts ions and electrons.

The development of planar solid oxide fuel cells has resulted in various concepts, which will be briefly described below.

First-generation SOFCs were based on an electrolyte-supported cell concept comprising a relatively thick electrolyte (approximately 150 µm), which was typically composed of yttria-stabilized zirconia (YSZ). Porous electrodes were applied to both sides of this supporting component. The anode generally included a cermet made of metallic and oxidic materials, which frequently were Ni and YSZ. The cathode comprised oxides having a perovskite structure, such as lanthanum strontium manganite (LSM) or lanthanum strontium cobalt ferrite (LSCF).

So as to achieve sufficiently high ionic conductivity of the electrolyte, these fuel cells are operated at temperatures in a narrow interval ranging between 850 and 1000° C. The drawback of these high operating temperatures, however, is the high demands that these entail for the operating process and the materials involved, wherein commonly employed steels cannot be used as interconnectors and heat exchangers because of the high temperatures. The goal has since been to make it possible to operate a high-temperature fuel cell at moderate temperatures, so as to allow the use of less costly materials, without resulting in any loss of performance.

The second-generation SOFCs converted to the so-called anode-supported concept, which allowed operating temperatures of even less than 800° C. to be implemented. Anode-supported fuel cells not only offer more freedom in terms of the stack design, but in addition to a low operating temperature, also create broad latitude between minimum and maximum operating temperatures. An anode-supported fuel cell combines a relatively thick (at a minimum approximately 200 µm, generally 200 to 1500 µm) mechanically load-bearing ceramic anode substrate with a thin, electrochemically active anode functional layer. Both generally comprise a porous nickel/YSZ cermet (YSZ: yttria-stabilized zirconia), to which the now thinner, gas-tight electrolyte is applied. The difference between the substrate and the anode functional layer is frequently not the composition (which is typically nickel and yttria-stabilized zirconia), but usually only the particle size that is used. A gas-tight YSZ electrolyte layer measuring approximately 10 µm is disposed on the anode functional layer. If an LSCF cathode is used in place of LSM, a diffusion barrier made of GCO (gadolinium cerium oxide, or the equivalent thereof gadolinium oxide-doped cerium oxide) is frequently applied between the electrolyte and LSCF cathode, because LSCF and YSZ are not chemically compatible. This diffusion barrier prevents reactions between LSCF and YSZ, notably the formation of electrically insulating intermediate phases.

So as to further improve the operating behavior in terms of thermal cyclability and mechanical stability and to further lower the operating temperatures to 600 to 750° C., the third generation involves electrolytic thin-film systems, which are based on a metallic carrier substrate.

Alternatives also provide for thicker electrolyte layers made of materials having high ionic conductivity (for example gadolinium oxide-doped cerium oxide (GCO), or zirconia fully stabilized with scandium oxide, such as 10Sc1CeSZ). Several metallic alloys, and more particularly certain ferritic steels, exhibit not only thermal expansion that is adjusted well to the cell layers, but also the good long-term behavior required for operating such a fuel cell (for example high corrosion and creep resistance), both when implemented as a dense interconnector and as a porous carrier substrate. At the same time, the classic YSZ/LSM composite cathode was replaced with a double-layer cathode, composed of a cathode layer comprising LSCF and an intermediate layer comprising GCO toward the electrolyte.

Because of the mechanical properties of metallic materials and inexpensive raw materials prices, metal-supported solid oxide fuel cells have great potential in application engineering. For the desired application, a substrate-supported fuel cell should, in the overall, satisfy the following properties and restrictions:

(1) high electronic conductivity of the substrate;
(2) high corrosion stability of the substrate, both in oxidizing and in reducing atmospheres;
(3) a thermal coefficient of expansion of the metallic substrate that is adjusted to the ceramic layers, preferably between 10 and $12 \cdot 10^{-6}$ $K^{-1}$;
(4) sufficient gas permeability for the fuel gas that is used, which means a porosity of at least 30 to 50% by volume for the substrate; and
(5) reduced surface roughness of the substrate so as to allow level and sealed coatings.

Moreover, the anode should exhibit sufficient catalytic activity in the anode functional layer as well as sufficient mechanical stability and integrity, and notably good adhesion to the substrate surface. The maximum sintering temperature for the applied anode layers should thus be considerably less than 1400° C. in a reducing atmosphere, and more particularly should be around 1200° C.

In particular because of the lower high-temperature resistance of the metallic carriers compared to ceramic carriers, however, different methods must be selected for applying the functional layers of the fuel cell when producing a metal-supported SOFC. The high surface roughness of metallic, porous substrates poses a regular challenge and must be significantly reduced for a functional anode layer and a thin electrolyte layer. In general, the problem of surface roughness can be reduced by way of gradation, in which several powder-technology layers having decreasing particle sizes are employed. Surface roughness has been found to be a particularly critical parameter for methods which can be used to produce dense electrolytes having a small thickness (less than 5 µm) at low temperatures, for example chemical vapor deposition or sol-gel technology.

In the past, thermal spraying and various sintering methods were employed for coating metallic substrates having low temperature resistance with a dense ceramic electrolyte. As a result of the rapid impingement of the molten ceramic particles and sudden cooling of the substrate surface (rapid solidification), thermal spraying generally creates a porous, laminar structure, which exhibits sufficient gas tightness only after several additional layers have been applied. This has the disadvantage of increasing the electrolyte layer thickness from approximately 5 to 10 µm to approximately 40 µm, in comparison with conventional non-metallic, anode-supported fuel cells. The increase in layer thickness of the electrolyte is accompanied by a significant rise in resistance. This resistance is further increased by the pores at the boundaries of the deposited solidification bodies (splats), which until now has prevented power densities to be achieved that are comparable to conventional non-metal-supported fuel cells.

Production by way of a sintering method, which utilizes powders in suspensions or pastes, as with conventional ceramic substrates, and subjects the same to thermal aging for sintering after coating, is limited for metal-supported SOFC primarily by the maximum temperature predetermined by the substrate. The electrolyte materials or powders used for conventional fuel cells comprising ceramic substrates generally require 1350° C. and higher in order to consolidate and form a layer having the required gas tightness. However, in light of the reduced sintering temperatures for metallic substrates, this is no longer feasible. So as to prevent, for example, intermetallic phases in a nickel-containing anode, which impair subsequent operation of the cell, temperatures of no more than 1200° C. are desirable for FeCr alloys used as substrates.

A fuel cell from Ceres Power Ltd. which utilizes a carrier comprising a perforated ferritic steel foil that is approximately 200 to 300 µm thick is known, for example, from [1]. Using conventional methods, such as wet spraying or screen printing, the anode is then deposited as a thick layer made of nickel cermet comprising gadolinium oxide-doped ceria (GCO) in a layer thickness between 10 and 20 µm, while the electrolyte, which likewise comprises GCO, is applied thereon in a layer thickness ranging between 10 and 30 µm by way of an electrophoretic process. Sintering can be carried at temperatures below 1000° C., especially because of the high packing density caused by the electrophoretic process.

The production of a metal-supported SOFC is also disclosed in [2], in which metallic knitted fabrics comprising CroFer22APU and porous plates, produced by way of powder metallurgy, were tested in addition to a nonwoven structure comprising an FeCrAlY alloy, as metallic substrates having a porosity of more than 80% by volume. The Ni/ZrO$_2$ cermet anode, which was approximately 50 µm thick and had a porosity of more than 20% by volume, was plasma sprayed, while DC vacuum plasma spraying, using high-speed nozzles, was employed to produce the dense YSZ electrolyte layer, which was approximately 40 µm thick.

Another method for producing a metal-supported SOFC includes laminating a thin, anode-supported cell onto a thicker metal substrate in the previously sintered state [3]. The drawback of this method is the high complexity of the manufacturing process and adhesion problems of the two components, especially with larger cell geometries. The production of the thin, laminated anode-supported cells alone requires the same technical complexity as conventional anode-supported cells that are already available for use, even without metal substrates. Sintering is carried out at a high temperature (approximately 1400° C.) in an oxidizing atmosphere, which necessitates a different furnace technology than sintering of the metallic component in a reducing atmosphere.

Another option that should be mentioned for applying an electrolyte coating to a metal substrate/anode unit is the PVD (physical vapor deposition, for example sputtering or electron beam evaporation) process, in particular when thin electrolyte layers are desired.

SUMMARY OF THE INVENTION

It is the object of the invention to provide a metal-supported, effective, solid oxide fuel cell (SOFC) comprising a gas-tight electrolyte layer that is as thin as possible, wherein this fuel cell can be operated with good performance at operating temperatures below 850° C., and more particularly between 650 and 750° C., which can be produced in a simpler manner than was possible until now according to the prior art.

The objects of the invention are achieved by an anode laminate for a metal-supported SOFC comprising all the characteristics according to the main claim and by a production method according to the additional independent claim. Advantageous embodiments of the anode laminate for a metal-supported SOFC or of the production method can be found in the respective dependent claims.

DESCRIPTION OF THE PREFERRED EMBODIMENTS

Figure 1:
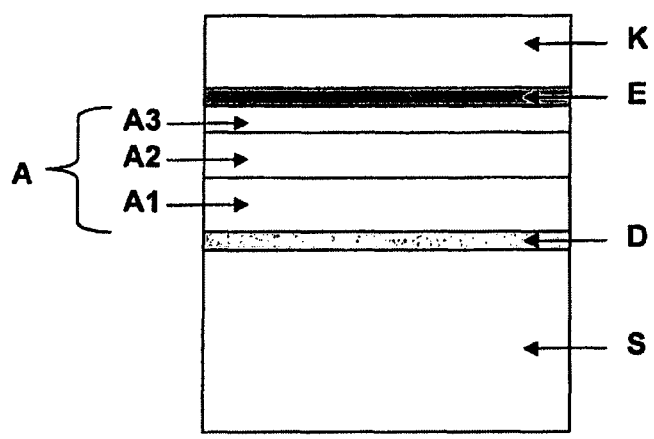
FIG. 1 is a schematic composition of the anode laminate according to the invention.

The object of the invention is achieved by an anode laminate for a metal-supported SOFC, to which a gas-tight thin-film electrolyte having a thickness of less than 10 µm can advantageously be applied by way of physical vapor deposition (PVD, for example sputtering or electron beam evaporation) or by way of sol-gel technology. For this purpose, the surface of the anode laminate according to the invention is smooth, having an average surface roughness $R_q$ of less than 4 µm, preferably less than 3 µm, and still more preferably less than 2 µm, and having a root mean square micro-roughness $R_q^\mu$ of less than 1 µm, and preferably less than 0.6 µm. The surface of the anode laminate, or the last layer of the anode laminate, preferably has a mean pore size of less than 1.5 µm, and preferably less than 0.8 µm. This is achieved by a coarse nickel phase and a finer ceramic phase (bimodal particle size distribution). The surface of the nickel phase, or the last layer of the anode laminate, preferably has a mean pore size of less than 4 µm, and preferably less than 3 µm.

Roughness may be used to physically characterize a surface. The primary profile was optically measured (confocal laser topograph) and the filtered roughness profile and the roughness values were calculated in accordance with DIN EN ISO 11562 and 4287. The scanning length ($l_t$), total measured length ($l_n$) and single measured length ($l_r$) were selected in accordance with DIN EN ISO 4288. According to DIN EN ISO 4287, the arithmetic mean roughness $R_a$ indicates the arithmetic average of the absolute values of all profile values of a roughness profile. The root mean square roughness $R_q$ is the root mean square of all profile values and gives greater consideration to outliers than the arithmetic mean roughness $R_a$. The root mean square roughness $R_q$ is also referred to as the average surface roughness within the scope of the invention. According to DIN EN ISO 4287, the average roughness depth $R_z$ is defined as the arithmetic mean of the individual roughness depths of all single measured lengths. A single roughness depth thus denotes the distance between the highest peak and the lowest trough of a single measured length. The total measured length is divided into five identically sized, consecutive segments (single measured lengths). Since the $R_z$ value is determined by the deepest valleys and the highest peaks, it is especially dependent on the measurement method that is used. When using, for example, mechanical contact stylus methods, instead of the optical methods used here, consideration must be given to the fact that it may not be possible to detect all sharp valleys, depending on the tip geometry that is used.

DIN EN ISO 4288 defines the breakdown of the primary profile into a waviness component that can be neglected in the roughness calculation (long waves) and into the actual roughness component (short waves) by means of a filter cut-off wavelength that is dependent on the roughness values that are achieved. For an arithmetic mean roughness $R_a$ greater than 0.02 µm and smaller than, or equal to, 2.00 µm, for example, a cut-off wavelength $\lambda_c$ of 0.8 mm is provided (with $l_r=\lambda_c$). However, irregularities in this wavelength do not play a crucial role for the quality and tightness of the layer, especially for layers applied by vapor deposition (PVD), but irregularities having a considerably shorter wavelength do. This invention therefore uses not only roughness according to DIN, but also so-called micro-roughness, which is based on a cut-off wavelength of 0.15 mm, with otherwise identical total measured lengths. This accordingly increases the number of the single measured lengths (normally 5), because $l_r=\lambda_c$ always applies. This micro-roughness was correspondingly labeled $R_a^\mu$, $R_q^\mu$ and $R_z^\mu$.

Additional characteristic parameters that maybe used to describe the properties of a sintered layer include the mean pore size and the sinter particle size. Both measures can be determined for arbitrary, including open-pored, structures using the intercepted-segment method on scanning electron microscopic images of cross-section polishes. For this purpose, first the individual phases (Ni particles, 8YSZ particles, pores) are appropriately marked in the images by means of differences in contrast, particle shape or element analysis (for example energy-dispersive X-ray spectroscopy, EDX), then straight lines are drawn statistically, and the intersecting points are marked at the transitions between the different phases. The average value of all lengths of the sections thus obtained which are located in a single phase reflects the mean intersecting line length for this phase (for example pores). This mean intersecting line length is converted into the actual particle size or pore size by multiplication with a corresponding geometry factor. Assuming the typically employed model representation of pores around tetradecahedric particles according to reference [4], the value 1.68 is used as the geometry factor and the value 1.56 is used for the particle size [5].

When reference is made in the present invention to mean pore sizes within the nickel phase, it shall be understood to mean a measure of the spaces formed by the nickel particles. Some of these are filled with 8YSZ particles (FIG. 4), which are not considered in the pore size of the nickel phase.

When reference is made in the present invention to sinter particle sizes, it shall be understood to mean the morphologically discernible particle size of the structure. The samples were not etched prior to analysis, and the inner grain boundaries within the phase that was examined remained without consideration, but only the material-to-pore transition or the transition to another material phase was considered.

The maximum pore size was determined from the largest inside diameters of all pores using a series of scanning electron microscopic images. The inside diameter of a pore for these purposes denotes the length of the largest straight length within the pore.

It is left up to the person skilled in the art to assure appropriate magnification of the microscopic images, depending on the pore and particle sizes that are to be determined. In particular, the pore or particle size to be determined still requires resolution, yet must still be captured fully by the image detail.

An anode laminate shall be understood to mean an at least three-layer laminate system, which assumes the function of the anode in the SOFC that is produced, which means that this is electrically conductive and porous and contains a catalytic component (nickel) for reformation and electrochemical oxidation of the fuel gas. A so-called anode functional layer that is 1 to 15 µm thick is located at the interface between the electrolyte and anode and the composition thereof corresponds to that of the anode, however it generally has a finer structure for high electrochemical conversion. Within the scope of the invention, this anode functional layer forms part of the anode laminate. The anode laminate according to the invention thus comprises at least two anode layers and at least one anode functional layer, wherein one (a first or lowest) anode layer is provided for the contact with the metallic substrate and another (the last or uppermost) anode functional layer is provided for the contact with an electrolyte.

An anode laminate having these properties can advantageously be made possible by a graded laminate, starting from a mechanically carrying substrate, using an at least double-layer anode and an anode functional layer. For this purpose, the selection and the ratio of suitable starting powders, the particle size distribution, and the selected layer thicknesses of the individually produced layers are decisive.

According to the invention, a porous metallic substrate is used as the mechanical carrying part for the SOFC. The porosity of the substrate should advantageously range between 20 and 70% by volume, and more particularly between 30 and 60% by volume. In general, substrates having a layer thickness between 200 and 1500 µm are employed. The substrate preferably has a mean pore size of 5 to 60 µm, advantageously of 20 to 50 µm, and particularly advantageously of 25 to 45 µm. This correlates with sinter particle sizes of 30 to 80 µm, whereby the material exhibits advantageous corrosion stability as compared to finer structures.

Both a ferriticFeCrMx alloy and a chromium-based alloy are suitable materials for the metallic substrate. In addition to iron, the FeCrMx alloy usually contains chromium at between 16 and 30% by weight, and additionally at least one alloying element, at a content of 0.01 to 2% by weight, from the group of rare earth elements or the oxides thereof, such as Y, $Y_2O_3$, Sc, $Sc_2O_3$, or from the group consisting of Ti, Al, Mn, Mo and Co.

Ferrochrome (1.4742), CrAl20-5 (1.4767) and Crofer 22 APU from Thyssen Krupp, FeCrAlY from Technetics, ZMG 232 from Hitachi Metals, SUS 430 HA and SUS 430 Na from Nippon Steel, as well as all powder metallurgical ODS iron-based alloys from Pansee, such as ITM Fe-26Cr—(Mo, Ti, $Y_2O_3$) shall be mentioned by way of example as suitable ferritic steels.

As an alternative, the porous metallic substrate may also be a chromium-based alloy, which means having a chromium content of more than 65% by weight, for example Cr5FelY or Cr5FelY$_2$O$_3$.

The application of a gas-tight thin-film electrolyte entails certain demands, with respect to the anode functional layer located thereunder, in terms of surface roughness and pore size. The desired properties in the form of a root mean square roughness $R_q$ of less than 4 µm, preferably less than 3 µm, and still more preferably less than 2 µm, and root mean square micro-roughness $R_q^\mu$ of less than 1 µm, and preferably less than 0.6 µm, or an advantageous mean pore size of less than 1.5 µm, and preferably less than 0.8 µm, can be achieved according to the invention by an at least 3-layer graded anode laminate. At the same time, this anode laminate should also meet the necessary requirements in terms of strength, conductivity, adhesion at a maximum sintering temperature of 1200° C., and catalytic function. Using appropriate starting particle sizes, for this purpose a bimodal sinter particle size is adjusted at which the mean sinter particle size of the nickel phase is at least twice as large as the sinter particle size of the ceramic phase. In the last anode layer, the nickel phase has a mean pore size of less than 4 µm, and preferably less than 3 µm. Some of these pores are filled with particles of the ceramic phase, which lowers the mean pore size in the overall to the aforementioned values.

So as to suppress metallic interdiffusion between the metal substrate and the metallic nickel phase of the anode cermet during sintering and subsequent cell operation, the metallic substrate is coated with a very thin ceramic diffusion barrier, which preferably comprises differently doped lanthanum strontium manganite (LSM) or lanthanum strontium chromite (LSCR) having differing lanthanum and strontium-contents. The layer thickness of the diffusion barrier may amount up to 50 µm, however advantageously it ranges between 0.5 and 5 µm. In this case, the applied diffusion barrier changes the surface properties of the metallic substrateonly insignificantly, in terms of the pore size and roughness, because of the very small layer thickness.

Starting from a metallic substrate, which is provided with a diffusion barrier, for example, according to the invention, a first anode layer comprising a ceramic that is chemically compatible with the substrate is applied using a wet-chemical method, preferably by way of screen printing, so as to reduce the surface roughness and surface pore size. A ceramic of this type may comprise, for example, a mixture of nickel particles and yttria-stabilized zirconia (YSZ), or a mixture of nickel particles and doped cerium oxide GCO. YSZ may be used both as fully stabilized and partially stabilized zirconia (3YSZ, 8YSZ, 10YSZ). The surface of a metallic substrate which is provided with the diffusion barrier generally exhibits a root mean square micro-roughness $R_q$ between 7 µm and 15 µm and a root mean square micro-roughness $R_q^\mu$ of 5 to 12 µm. The optically determined mean pore size ranges between 20 µm and 50 µm.

So as to prevent infiltration of this first anode layer into the metallic carrier and also achieve sufficient sintering of the ceramic component at a maximum temperature of 1200° C., according to the invention a powder mixture having a bimodal particle size distribution of nickel-containing powder to YSZ powder is used, wherein the content of nickel-containing powder is more than 50% by weight, and advantageously as much as 60 to 80% by weight. Pure nickel powder is advantageously used as the nickel-containing powder. The YSZ powder that is used preferably has a mean particle size between 0.5 µm and 1.5 µm, and more preferably around 0.6 µm. The mean particle size of the nickel powder that is used preferably ranges between 3 µm and 20 µm, and more preferably around 5 µm. A layer thickness between 10 and 80 µm is advantageously selected for the first layer.

The second anode layer comprising nickel and YSZ is likewise applied by way of a wet-chemical method to the first anode layer and must copy the identical requirements of the first layer, with the exception that the roughness and pore size are reduced further.

This is achieved by the powder mixture that is used for the second anode layer having a reduced bimodal particle size distribution as compared to the first anode layer, in such a way that there is no, or only minor, infiltration into the first anode layer, and no infiltration into the metallic substrate. A content of nickel-containing powder of more than 50% by weight, and advantageously as high as 60 to 80% by weight, is also selected for this layer. Pure nickel powder is advantageously used as the nickel-containing powder. While the YSZ powder that is used likewise has a mean particle size between 0.5 µm and 1.5 µm, and preferably around 0.6 µm, the mean particle size of the nickel powder that is used for the second layer is only 0.7 µm to 4 µm, and preferably around 1.2 µm, but in no case less than that of the first anode layer. The selected particle sizes of the powder and the applied layer thickness of this second layer, which advantageously ranges between 10 and 50 µm, result in considerably reduced roughness and a reduced pore size compared to the first layer.

As the last (uppermost) layer of the anode laminate, an active anode functional layer comprising NiO and YSZ, which compared to previously known anode functional layers made of anode-supported SOFCs has a considerably higher NiO content of at least 80% by weight, is applied, again by way of wet-chemical methods (screen printing, immersion coating, slip casting), onto this second anode layer, or optionally additional anode layers, in which, in each case, the mean particle size of the nickel powder is reduced. After sintering at a maximum of 1200° C. in a reducing atmosphere, the layer conductivity will thus be sufficient.

So as to further reduce roughness and pore size, the NiO powder and YSZ powder that are used have an even further reduced mean particle size distribution than the second layer, or any other interposed layers. Because of the required small particle diameter, NiO is typically used for this anode functional layer instead of pure nickel powder, because pure nickel powder usually reacts very quickly with atmospheric oxygen to form nickel oxide because of the large surface. For the last layer (anode functional layer), a YSZ powder having mean particle size of 0.1 to 0.3 µm and an NiO powder having a mean particle size of 0.1 to 0.5 µm should be employed. The layer thickness should advantageously range between 1 and 15 µm.

According to the invention; an in-total at least 3-layer laminate system having the function of an anode is thus produced, in which the root mean square roughness $R_q$ of the last layer (anode functional layer) provided for the contact with an electrolyte has values less than 4 µm, and preferably less than 2 µm, and the root mean square micro-roughness $R_q^\mu$ has values less than 1 µm, and preferably less than 0.6 µm, and this layer has a mean pore size of no more than 1.5 µm, and preferably between 0.2 and 0.8 µm. For this purpose, it may be necessary to apply additional anode layers, or optionally additional anode functional layers, in addition to the aforementioned three layers.

It is left up to the person skilled in the art to select how many layers, each having a reduced particle size, will be required to arrive at the desired properties of the uppermost anode functional layer, based on the properties (roughness and mean pore size) of the starting substrate, or of the diffusion barrier disposed thereon, so as to assure successful application of the gas-tight thin-film electrolyte having a thickness of less than 10 µm. Examples of corresponding parameters can be found in the implementation section.

The anode (anode laminate) thus produced and provided with the aforementioned properties is then preferably sintered. The sintering temperature is notably less than 1300° C. The anode laminate can then be coated with a thin-film electrolyte. This coating is preferably carried out after the anode laminate is sintered. An additional adaptation layer may be disposed between the anode laminate and the thin-film electrolyte so as to adapt the thin-film electrolyte to the last layer of the anode laminate. This is favorable in terms of homogeneous growth of the electrolyte layer. For this purpose, the material properties of the adaptation layer are better adapted to the electrolyte than those of the last layer of the anode laminate by the adaptation layer, for example, having a smaller mean pore size than the last layer of the anode laminate.

Vapor deposition methods, and more particularly physical vapor deposition (PVD) or sol-gel technologies, are suitable methods for applying the thin-film electrolyte. The layer thickness of the electrolyte should not exceed 10 µm so as to minimize the resistance. Advantageous embodiments comprise a gas-tight electrolyte having a layer thickness of less than 10 µm.

Moreover, optionally using an interposed diffusion barrier layer, a high-performance cathode, preferably made of lanthanum strontium cobalt ferrite (LSCF), can be applied to the electrolyte using a wet-chemical method.

The entire laminate is advantageously not sintered any more during the cell manufacturing process, wherein in-situ sintering at temperatures below 1200° C. is advantageous for start-up of the cell.

The invention will be described in more detail hereafter based on a specific exemplary embodiment, a table and several figures. This is also intended to allow a person skilled in this art, where applicable in accordance with the general conditions of the substrate that is used or the requirements of the thin-film electrolyte that is to be applied, to consider certain modifications within the scope of the teaching according to the invention in terms of the materials, the layer thicknesses or the selected particle sizes as being part of the invention.

FIG. 1 shows the schematic composition of the anode laminate (A) according to the invention, comprising at least two anode layers (A1, A2) and an anode functional layer (A3), the laminate being disposed above a diffusion barrier (D) on a metallic substrate (S). Thereafter, a thin-film electrolyte (E) and a cathode (K) can advantageously be applied to this anode laminate.

The described drawbacks from the prior art can be overcome by a thin-film electrolyte, which is produced in particular by way of physical vapor deposition (PVD) or a sol-gel technology and is applied to a suitable anode. For a particularly thin, gas-tight electrolyte (<10 µm), a surface roughness of less than 4 µm for $R_q$, of less than 1 µm for $R_q^\mu$, and of less than 2 µm for $R_z^\mu$ is generally required or advantageous.

For this purpose, the invention describes an anode laminate (A) for a metal-supported SOFC, on which a gas-tight thin-film electrolyte (E) having a thickness of <10 µm can be advantageously applied by way of PVD or sol-gel technology.

The carrier that is used is a porous metallic substrate (S) made of ITM, which has a porosity of 30 to 60% by volume and was produced by Plansee.

So as to suppress metallic interdiffusion between the metal substrate and the metallic anode during sintering and subsequent cell operation, the metal substrate (S) is coated with a ceramic diffusion barrier (ID) comprising LSM. Diffusion barriers (D) comprising LSCR or CGO are also conceivable. The layer thickness of the diffusion barrier is generally approximately 1 to 3 µm.

Diffusion barriers having layer thickness from 0.1 up to 50 µm are known, for example, from WO 2008/003113.

The application of a gas-tight thin-film electrolyte entails certain demands with respect to the last anode layer located beneath (last layer of the anode laminate, anode functional layer) in terms of roughness and pore size, which can be satisfied by a multi-layer graded laminate. At the same time, this anode laminate must also meet the necessary requirements in terms of strength, conductivity, adhesion at a maximum sintering temperature of 1200° C. and catalytic function, and must exhibit a thermal expansion coefficient that is adapted to the remaining fuel cell components.

Starting from a metallic substrate (S), which is provided with a diffusion barrier (D) and has a surface roughness $R_q^\mu$ between 7 µm and 15 µm, micro-roughness $R_q^\mu$ between 5 and 12 µm, and a mean pore size between 20 µm and 50 µm, using a wet-chemical method (screen printing, immersion coating, slip casting) a first anode layer (A1) comprising Ni/8YSZ having a layer thickness of approximately 40 µm is applied so as to reduce the surface roughness to $R_q$ values between 5 and 6 µm and micro-roughness $R_q^\mu$ to 3 to 4 µm. For this purpose, the first anode layer, in the overall, has mean pore sizes around 2 µm, which is achieved by a nickel skeleton which is filled with 8YSZ particles and has a mean pore size of approximately 8 µm in the nickel phase.

So as to prevent infiltration of this first anode layer (A1) into the metallic carrier (S) and also achieve sufficient sintering of the ceramic component at 1200° C., a bimodal particle size distribution of nickel powder having a mean particle size of about 5 µm to 8YSZ powder having a mean particle size of approximately 0.6 µm, and a YSZ content of 35% by weight powder, are selected. The particle size and the powder content of the 8YSZ powder must remain in this range because it must fulfill the additional task of acting as a sintering inhibitor of this anode layer. This bimodality is likewise pronounced in the sintered first anode layer. The mean sinter particle size in the nickel phase is preferably approximately 6.5 µm, and the mean sinter particle size in the 8YSZ phase is preferably approximately 0.7 µm.

The second anode layer (A2), comprising Ni/8YSZ, is likewise applied by way of a wet-chemical method to the first anode layer (A1) and must copy the identical requirements of the first layer, with the exception that the roughness and pore size must be further reduced. This is achieved by reducing the bimodal particle size distribution, however only in such a way that no, or only minor, infiltration into the first anode layer and no infiltration into the metallic substrate take place. This is achieved by using a nickel powder having a mean particle size of approximately 1.2 µm and a content of 65% by weight. An 8YSZ powder (35% by weight powder content) having a mean particle size of preferably approximately 0.6 µm is used as the sintering inhibitor and pore-forming material. The layer thickness of this second anode layer is adjusted to 15 µm, whereby a roughness $R_q$ of less than 5 µm, and in this example of 2.3 µm, and micro-roughness of less than 2 µm, and in this example of 1.0 µm, are achieved. The overall mean pore size of this second anode layer is 1.0 and 1.2 µm, wherein the mean pore size within the nickel phase is between 4.0 and 4.5 µm. The structure usually has a mean sinter particle size of approximately 3 µm for the nickel phase and approximately 0.7 µm for the 8YSZ phase.

An active anode functional layer (A3) comprising NiO/8YSZ is applied to this second anode layer (A2), likewise by way of a wet-chemical method (screen printing, immersion coating, slip casting), wherein compared to existing known anode functional layers comprising anode-supported SOFCs, this active anode functional layer has a considerably higher NiO content of 80% by weight, which results in sufficient layer conductivity after sintering at 1200° C. in a reducing atmosphere. So as to further reduce roughness and pore size, an NiO powder having a mean particle size distribution of 0.3 μm and an 8YSZ powder having a mean particle size distribution of approximately 0.2 μm are used. The layer thickness of the anode functional layer was selected at between 3 and 6 μm so as to achieve roughness $R_q$ of less than 3 μm, and in this case approximately 1.3 μm. With this layer, the micro-roughness $R_q^\mu$ is reduced to values below 1 μm, and in this example to values around 0.37 μm. This generally results in mean pore sizes of approximately 0.6 μm, which correlates with a pore size in the nickel phase of approximately 2.2 μm. After sintering, the structure in the third layer also has a strongly bimodal particle size distribution: the mean sinter particle sizes are approximately 1.5 μm for the nickel phase and approximately 0.25 μm for the 8YSZ phase.

This anode functional layer (A3) that is generated is now sintered, together with the complete anode laminate (A1, A2 and A3), at temperatures below 1300° C. and can then be coated, starting with an adaptation layer, or directly with a thin-film electrolyte (E), which is applied by way of PVD of sol-gel technology.

Thereafter, a high-performance cathode, preferably comprising lanthanum strontium cobalt ferrite (LSCF), can be applied by way of a wet-chemical method and sintered in-situ with start-up of the cell.

Figure 2:
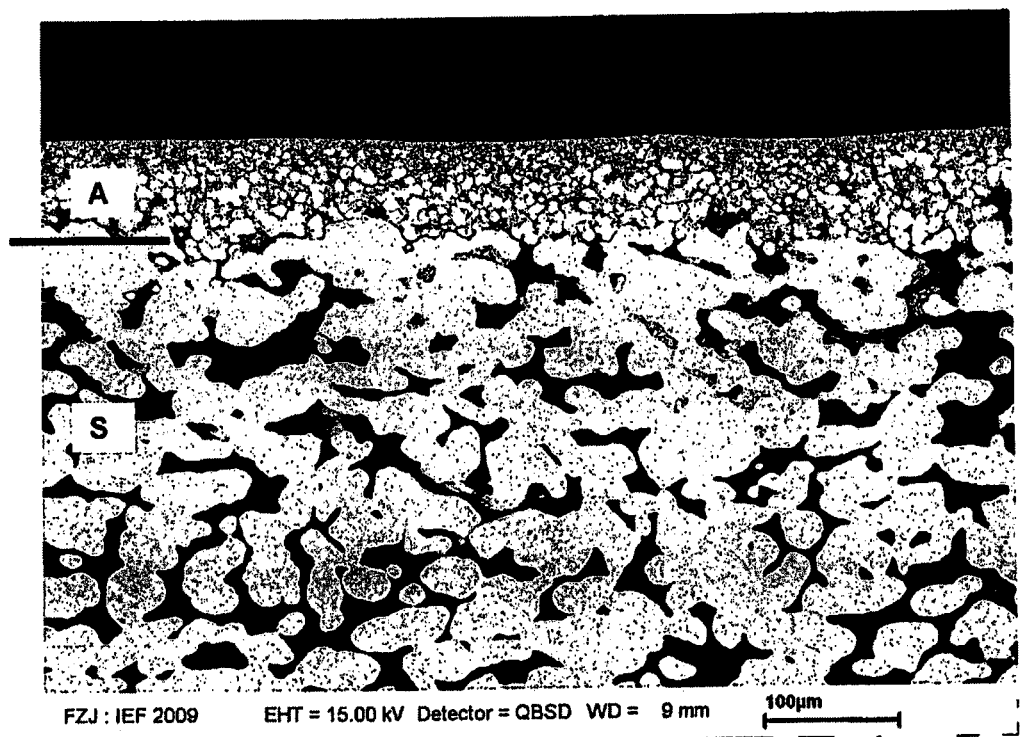
FIG. 2 is a coarse cross-section polish of the developed graded composition of an anode laminate according to the invention.
Figure 3:
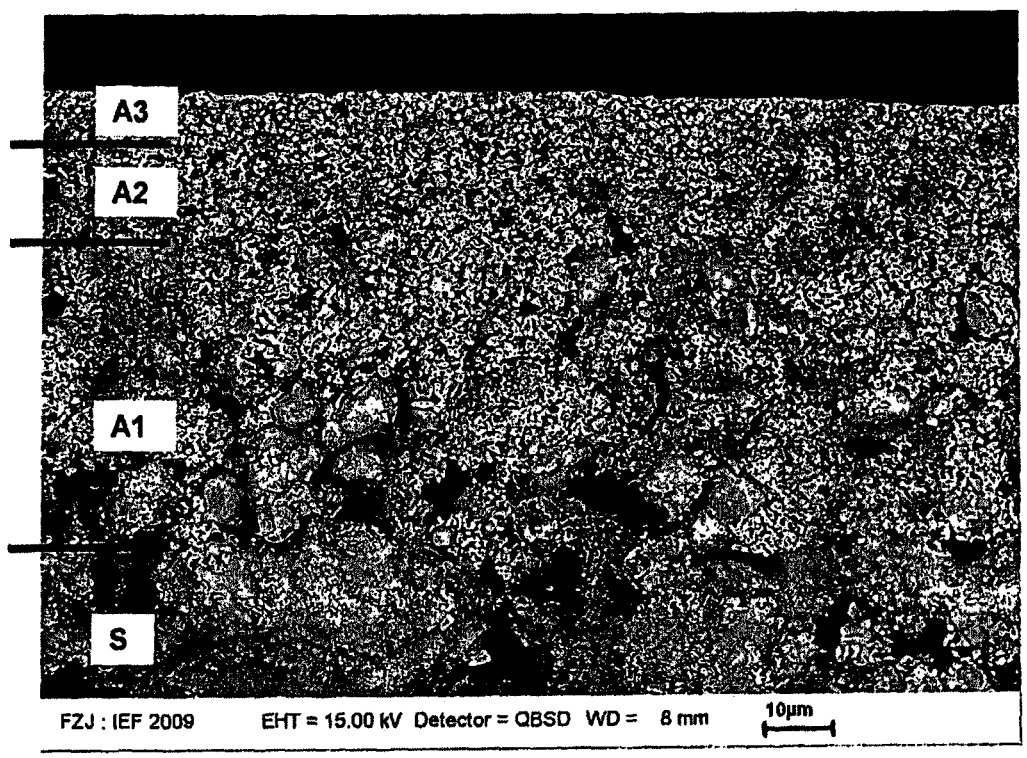
FIG. 3 is a near-field image of the substrate and of the anode laminate as a fracture surface was taken to illustrate the structure.
Figure 4:
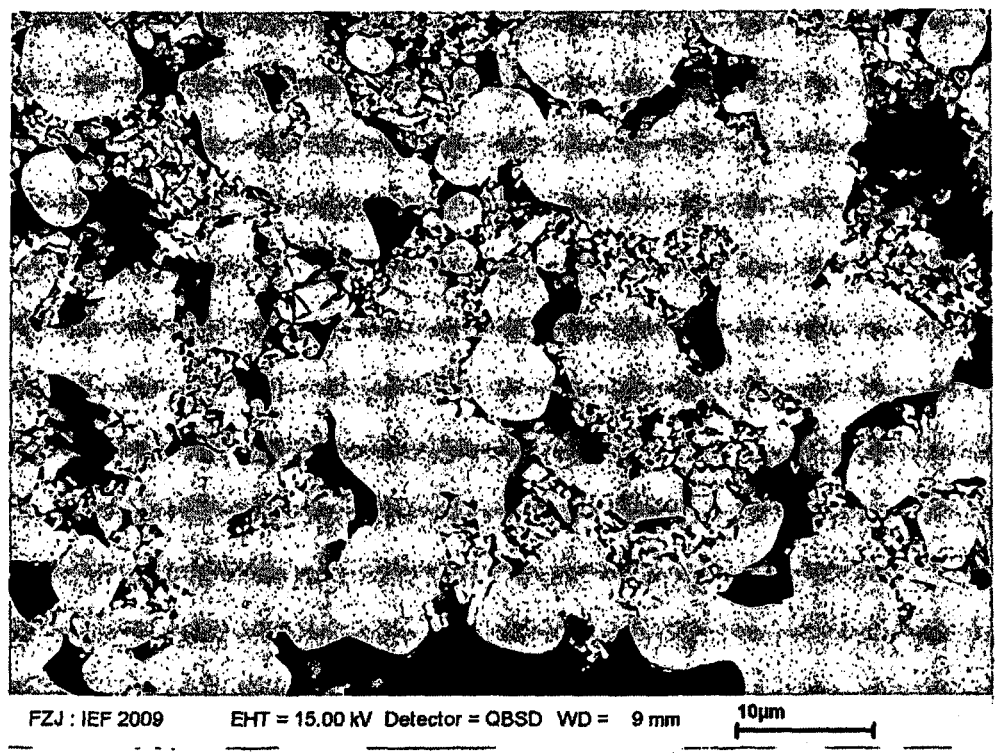
FIG. 4 is a cross-section polish of a first anode layer.

The anode laminate according to the invention, or individual layers of this laminate, are illustrated in FIGS. 2, 3 and 4.

FIG. 2 shows a coarse cross-section polish of the developed graded composition of an anode laminate according to the invention on a porous metal substrate (S) containing no. S denotes the substrate, and A identifies the anode laminate (A1, A2 and A3). The diffusion barrier is not apparent from this figure because of the low layer thickness. The coarsely porous structure of the metallic substrate is apparent, to which the individual layers of the anode laminate were consecutively applied. In this example, the anode layers A1 to A3 were consecutively applied to the ITM substrate by way of screen printing, dried in each case, and then sintered together at 1200° C. for 3 hours in a hydrogen atmosphere.

Terpineol was used as the solvent in all pastes, and ethyl cellulose was used as the binding agent. For the first two anode layers, the Ni:8YSZ ratio was 65:35% by weight. For this purpose, nickel powders from Vale Inca (Vale Inca Europe Limited, London, England), having a measured particle size distribution of $d_{10}$=3.7 μm, $d_{50}$=13 μm, $d_\pi$=41 μm (Ni type 123) were used for the first anode layer (A1) and of $d_{10}$=0.8 μm, $d_{50}$=2.4 μm, $d_{90}$=5 μm (Ni type 110) were used for the second anode layer (A2). The manufacturer indicates the mean particle sizes of the two powders to be 3 to 7 μm (type 123) and 0.8 to 1.5 μm (type 110), respectively, using the Fisher Sub-Sieve Sizer method. In addition, an 8YSZ powder from Unitec (FYT13-005H, Unitec Ceramics Ltd., Stafford, UK) was used for both layers, which after the grinding and dispersion step had a particle size of $d_{10}$=0.23 μm, $d_{50}$=0.56 μm, $d_{90}$=1.2 μm. The manufacturer stated the particle size of the non-processed powder to be $d_{50}$=1.06 μm. The total solids contents in the pastes were 69.3% by weight (A1)) and 59.0% by weight (A2), and the contents of the binding agent (ethyl cellulose 45 cps, Sigma-Aldrich Chemie GmbH, Taufkirchen) were 2.8% by weight (A1) and 2.4% by weight (A2).

The indicated particle sizes were determined by means of static light scattering (Fritsch analysette 22, Fritsch GmbH, Idar-Oberstein) and in some cases deviate from the manufacturer's information determined by way of other methods. This is due to the measuring method as such, which measures irregularly shaped particles differently, as well as the achievable dispersibility. While relatively high mechanical forces act on the particles with the Fisher Sub-Sieve Sizer method, the particles were dispersed in an ethanol suspension by means of ultrasound when measured by way of static light scattering, whereby harder agglomerates were not solubilized. The latter generally also applies to the manufacturing process as a whole.

The anode functional layer (A3) itself was made of NiO from Baker (Mallinckrodt Baker Inc., Phillipsburg, USA), having a particle size distribution in the preground and dispersed stage of $d_{10}$=0.14 μm, $d_{50}$=0.29 μm, $d_{90}$=1.2 μm and 8YSZ from Tosoh (TZ-8Y, Tosoh Corp., Tokyo, Japan) with $d_{10}$=0.12 μm, $d_{50}$=0.23 μm, $d_{90}$=0.36 μm in a ratio of 80:20% by weight, with a total solids content of 58.4% by weight and a binding agent content of 2.3% by weight (ethyl cellulose 10 cps, Sigma-Aldrich GmbH). For the raw NiO powder, the manufacturer specifies less than 3 μm in terms of the mean particle size, which was reduced correspondingly due to processing. For the 8YSZ powder, the manufacturer indicates a mean particle size of 40 nm, as determined by way of transmission electron microscopy. The manufacturer indicates the mean particle size to be 0.58 μm. This value is considerably higher than the stated particle size, because the individual particles were agglomerated in the starting powder to form spray granules. In addition, hard agglomerates formed, which cannot be broken up at any point in the further processing stage. A particle size of approximately 150 nm was determined in scanning electron microscopic images. The measurement method must therefore always be considered in the indicated particle sizes.

The powders were each predispersed in solvent, then homogenized in grinding containers using appropriate mixing ratios, and subsequently processed together with a binding agent solution to form a paste and homogenized on a three-roller mill (Exakt 50, ExaktVertriebs GmbH, Norderstedt). Screens having the woven fabric parameters 18 and 180 (for A1), 27 and 071 (for A2) and 47 and 045 (for A3) (first number: threads per cm; second number: thread thickness in μm) were used for screen printing. The individual layers were dried at 60° C. All three layers were sintered together at 1200° C. over a period of 3 hours in hydrogen, whereby the NiO in the anode functional layer was reduced to metallic nickel.

A near-field image of the substrate and of the anode laminate as a fracture surface was taken to illustrate the structure (FIG. 3). Both the graded composition of the laminate (S, A1, A2, A3) and the bimodal particle size distribution within the anode layers are clearly apparent. The finer 8YSZ phase is visible in the form of light splash-like particles, which differ significantly from the larger, roundish nickel particles. The porous 8YSZ phase almost completely fills the spaces between the sintered nickel particles.

A first anode layer was recorded in FIG. 4 as a cross-section polish. The net-shaped structure of the sintered nickel particles (large, light gray areas) and the 8YSZ particles located in the spaces are clearly apparent.

The table summarizes the values measured for the anode laminate. The roughness values for A1 and A2 were determined in the dry state, and the roughness values for A3 were determined in the sintered final state. Additional measurements show that the roughness values for samples that are otherwise identical agree both in the dry and sintered states (variances less than 10% of the measured value). The differences in the micro-roughness ($\lambda_c$=150 μm) are greater in particular for the last two layers, A2 and A3, than the roughness calculated based on the DIN standard.

For roughness, the laser topograph CT200 (Cybertechnologies GmbH, Ingolstadt) was used with an LT9010 confocal laser sensor (measuring spot size approximately 2 μm, vertical resolution 10 nm). Prior to application of the DIN regulations, the primary profiles measured in 1 μm increments were filtered using a Gaussian filter α=ln(2), filter length 5 μm, so as to minimize individual faulty signals due to multiple reflections.

For the particle and pore sizes of the sintered structure, which were determined by way of the line method, at least three scanning electron microscopic images of cross-section polishes of the layers were evaluated in each case for each parameter. During this process, 500 to 1000 lines were drawn per image. With a pixel count of the scanning electronic images of 1024×768 pixels, a total section measuring 700 to 1500 μm wide was selected for the substrate, of 65 to 80 μm for the first layer of the anode laminate (A1), of 30 to 60 μm for the second layer (A2), and of 5 μm (for the 8YSZ particle size) to 30 μm (other parameters) for the anode functional layer (A3). The inner grain boundaries were not taken into consideration in the particle size information, but only the outer morphology. The individual phases were separated because of the differences in particle shape and minor contrast differences, which were confirmed by EDX element analyses. The difference between the sinter particles sizes of the nickel and 8YSZ phases is very pronounced. The particle size of the nickel is at least four times that of 8YSZ in all layers.

Examples of parameters for the mean particle sizes of the dispersed and partially ground starting powders, as determined by way of static light scattering (particle sizes of the manufacturers determined by way of other methods shown in parentheses), and the composition of the layers, the roughness values in the dry (A1, A2) or sintered (A3) state, and the individual layer thicknesses, particle sizes and pore sizes in the sintered state are shown in the table below.

| | Substrate (S) | 1st layer (A1) | 2nd layer (A2) | 3rd layer (A3) |
|---|---|---|---|---|
| mean particle size Ni or NiO [μm] | — | 12.5 (3-7) | 2.4 (0.8-1.5) | 0.29 (<3 μm) |
| mean particle size 8YSZ [μm] | — | 0.6 (1.06) | 0.6 (1.06) | 0.23 (0.04) |
| 8YSZ content (% by weight) | 0 | 35 | 35 | 20 |
| layer thickness [μm] | 950 to 1050 | 20 | 15 | 5 |
| roughness values $R_a/R_q R_z$ [μm] | 9.1/12/72 | 4.2/5.5/32 | 1.8/2.3/12 | 1.1/1.3/5.7 |
| micro-roughness values $R_a{}^\mu/R_q{}^\mu/R_z{}^\mu$ [μm] | 7.0/8.7/34 | 2.7/3.3/12.6 | 0.91/1.0/3.4 | 0.37/0.45/1.7 |
| mean sinter particle size Ni phase (μm) | 53 (total) | 6.5 | 2.9 | 1.5 |
| mean sinter particle size 8YSZ phase [μm] | — | 0.7 | 0.7 | 0.25 |
| mean pore size Ni phase [μm] | — | 7.8 | 4.3 | 2.2 |
| mean pore size, overall [μm] | 33 | 1.9 | 1.1 | 0.6 |
| max. pore size, overall [μm] | 120 | 14 | 6.9 | 3.0 |

LITERATURE CITED IN THIS APPLICATION

[1] P. Attryde, A. Baker, S. Baron, A. Blake, N. P. Brandon, D. Corcoran, D. Cumming, A. Duckett, K. El-Koury, D. Haigh, M. Harrington, C. Kidd, R. Leah, G. Lewis, C. Matthews, N. Maynard, T. McColm, A. Selcuk, M. Schmidt, R. Trezona, L. Verdugo, Stacks and System based around metal supported SOFCs operating at 500-600° C.", Electrochemical Proceedings Volume 2005-07, Vol. 1, pages 113-122 [2005].

[2] G. Schiller; "Metallgestützte SOFC-Zellen (Metal-supported SOFC cells)", training seminar on materials questions related to high-temperature fuel cells, Deutsche GesellschaftfürMaterialkunde (German Society for Materials Science) (publisher), Jülich, Apr. 26 to 28, 2006 (presentation and paper).

[3] H. J. Cho and G. M. Choi: Fabrication and characterization of Ni-supported solid oxide fuel cell, *Solid State Ionics* 180 [11-13], 792-795 (2009).

[4] T. S. Smith: "Morphological Characterization of Porous Coatings." In: "Quantitative Characterization and Performance of Porous Implants for Hard Tissue Applications", ASTM STP953, J. E. Lemmons, publisher, American Society for Testing and Materials, Philadelphia, 1987, pp. 92-102.

[5] M. I. Mendelson: "Average Particle size in Polycrystalline Ceramics", J. Am. Ceram. Soc. 52 [8] (1969), 443-446.

The invention claimed is:

1. A substrate-supported anode for a high-temperature fuel cell, comprising at least a three layer anode laminate applied on a metallic substrate;
   the three layers of the at least three layer anode laminate comprising yttria-stabilized zirconia (YSZ) particles and nickel-containing particles;
   the layers of the anode laminate having a decreasing mean particle size of the nickel-containing particles as the distance from the substrate increases, wherein at least in a first layer and a second layer of the anode laminate, the mean particle size of the nickel-containing particles with respect to the mean particle size of the YSZ particles is bimodal, the first layer of the anode laminate being closest to the metallic substrate; and the mean surface roughness of the last layer of the anode laminate, which is intended for contact with an electrolyte, is less than 4 μm.

2. The anode according to claim 1, wherein the anode is sintered and the last layer of the sintered anode laminate has a mean pore size in a nickel phase formed of nickel-containing particles of less than 4 μm or a total mean pore size of less than 1.5 μm.

3. An anode according to claim 1, further comprising a metallic substrate comprising a chromium-based alloy having a chromium content of more than 65% by weight, or a ferritic FeCrMx alloy having a chromium content of 20 to 30% by weight, and where Mx=at least one element or an oxide of the group of the rare earth elements, Sc, Ti, Al, Mn, Mo or Co.

4. An anode according to claim 3, wherein the metallic substrate has a mean pore size between 5 and 60 μm.

5. An anode according to claim 3, further comprising a diffusion barrier, which is disposed between the metallic substrate and the first layer of the anode laminate.

6. An anode according to claim 1, wherein the anode is sintered and the first layer of the sintered anode laminate has a mean pore size in a nickel phase formed of nickel-containing particles between 4 and 15 μm or a total mean pore size between 1 and 8 μm.

7. An anode according to claim 1, wherein the anode is sintered and the second layer of the sintered anode laminate has a mean pore size in a nickel phase formed of nickel-containing particles between 2 and 7 μm or a total mean pore size between 0.5 and 4 μm.

8. A method for producing a substrate-supported anode for a high-temperature fuel cell, the anode comprising at least a three-layer anode laminate disposed on a metallic substrate in which the three layers of the at least three-layer anode laminate comprise yttria-stabilized zirconia (YSZ) particles and nickel-containing particles, wherein the layers of the anode laminate have a decreasing mean particle size of the nickel-containing particles as the distance from the substrate increases, the method comprising:

applying said at least three-layer anode laminate to said metallic substrate, wherein at least in a first layer and a second layer of the anode laminate, the mean particle size of the nickel-containing particles with respect to the mean particle size of the YSZ particles is bimodal; and wherein said applying comprises reducing from each one layer to each next layer of said at least three-layer anode laminate at least the mean particle size of the nickel-containing particles, whereby surface roughness that results for a last layer of the anode laminate, which is intended for contact with the electrolyte, is less than 4 μm.

9. The method according to claim 8, wherein the mean particle size of the nickel-containing particles in the last layer of the anode laminate is no more than 0.5 μm.

10. A method according to claim 8, wherein the metallic substrate that is used has a mean surface roughness between 7 μm and 15 μm.

11. A method according to claim 8, wherein a diffusion barrier is applied to the metallic substrate before the anode laminate is applied.

12. A method according to claim 8, wherein 8YSZ particles having a mean particle size between 0.5 and 1.5 μm and nickel-containing particles having a mean particle size between 3 and 20 μm are used for the first layer of the anode laminate.

13. A method according to claim 8, wherein 8YSZ particles are used for the first layer of the anode laminate in a content of 20 to 40% by weight.

14. A method according to claim 8, wherein the mean surface roughness of the first layer of the anode laminate is between 2 and 8 μm.

15. A method according to claim 8, wherein 8YSZ particles having a mean particle size between 0.5 and 1.5 μm and nickel-containing particles having a mean particle size between 0.7 and 4 μm are used for the second layer of the anode laminate.

16. A method according to claim 8, wherein 8YSZ particles are is used for the second layer of the anode laminate in a content of 20 to 40% by weight.

17. A method according to claim 8, wherein 8YSZ particles having a mean particle size between approximately 0.1 and 0.3 μm and nickel-containing particles having a mean particle size between approximately 0.1 and 0.5 μm are used for the last layer of the anode laminate.

18. A method according to claim 8, wherein 8YSZ particles are used for the last layer of the anode laminate in a content of 5 to 20% by weight.

19. A method according to claim 8, wherein the root mean square roughness of the second layer of the anode laminate is less than 5 μm.

20. A method according to claim 8, wherein a thin-film electrolyte is applied to the anode laminate, in particular by way of PVD or a sol-gel method.

21. The method according to claim 20, wherein a cathode is applied to the thin-film electrolyte and sintered in situ.

22. The high-temperature fuel cell according to claim 3, wherein the metallic substrate has a mean pore size between 20 and 50 μm.

* * * * *